(No Model.)

A. L. MILLS.
NUT LOCK WASHER.

No. 560,042. Patented May 12, 1896.

WITNESSES
Carroll J. Webster
Bertha M. Schweizer

INVENTOR
Arthur L. Mills
By William Webster
Atty

UNITED STATES PATENT OFFICE.

ARTHUR L. MILLS, OF TOLEDO, OHIO.

NUT-LOCK WASHER.

SPECIFICATION forming part of Letters Patent No. 560,042, dated May 12, 1896.

Application filed October 16, 1893. Serial No. 488,211. (No model.)

*To all whom it may concern:*

Be it known that I, ARTHUR L. MILLS, of Toledo, county of Lucas, and State of Ohio, have invented certain new and useful Improvements in Nut-Lock Washers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a nut-lock washer, and has for its object to provide a washer having a central orifice, the washer being convexed radially therefrom, said orifice having an annular wall in a plane parallel with the length of the bolt and a portion of the metal at the apex of the washer of a lesser angle than the angle of convexity of the washer, whereby when the washer is placed upon the bolt with the apex against the nut and the body forced to a plane parallel with the face of the nut the impinging wall of the washer, which is of greater pitch than the thread of the bolt, will enter and fit into the thread, with the result that the heaviest portion of the wall of the washer will contact with the lighter portion of the thread of the bolt, whereby the apex of the thread is spread toward and against the nut.

With these objects in view the invention consists, broadly, in a conical washer having a central orifice of a diameter to fit the bolt, and a portion of the wall of the orifice on a plane parallel with the periphery of the bolt, and the apex of the wall angled obtusely to the parallel plane of the wall of the orifice, whereby when the washer is forced to a plane parallel with the top face of the nut upon the bolt the wall will present an angled impinging annulus of greater pitch than the pitch of the thread.

Figure 1:
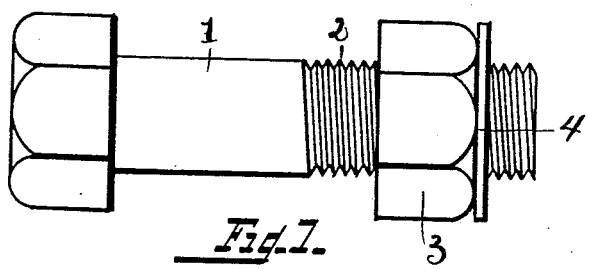
Figures 2, 3, 4, 5:
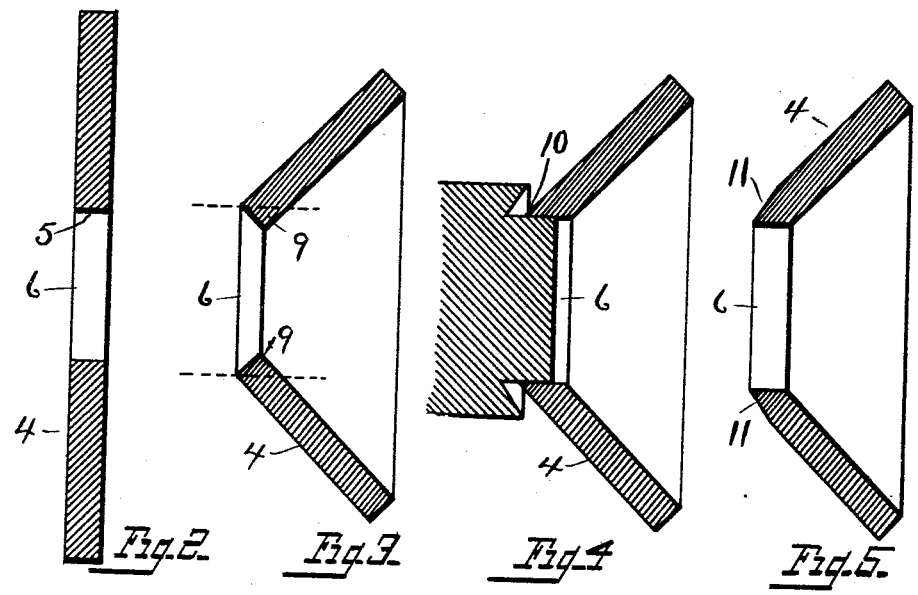
Figures 6, 7, 8:
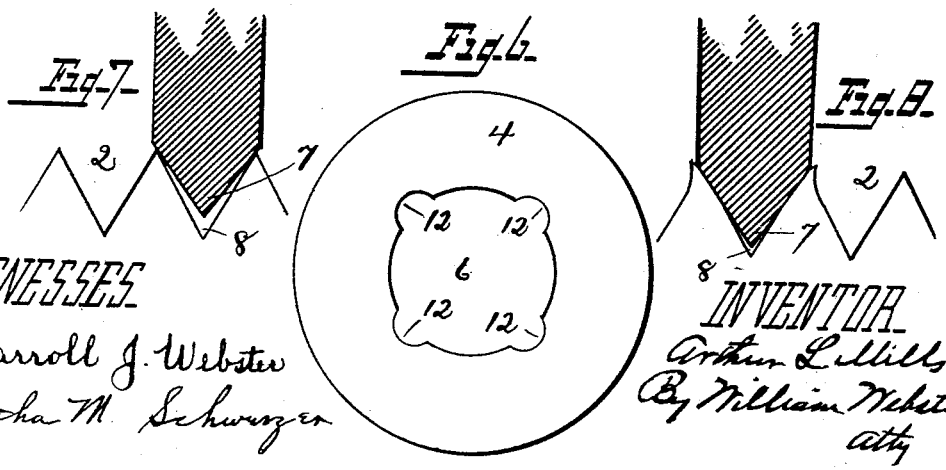

In the drawings, Figure 1 is a plane view of a bolt having a nut locked thereon by my improved washer. Fig. 2 is a transverse elevation of a blank prior to being dished and angled at the wall. Fig. 3 is a transverse elevation of the washer when dished, the dotted lines indicating the first stage of trimming the wall of the washer to form an angle to the same when the washer is flattened. Fig. 4 is a like view showing in transverse elevation a tool for effecting the first operation and also a second operation—to wit, that of upsetting the wall of the orifice at the apex to an obtuse angle to the remaining portion. Fig. 5 is a transverse elevation of the washer, showing the wall of the orifice formed in accordance with my invention. Fig. 6 is a plan view of the washer flattened. Fig. 7 is a detail view showing the relative pitch of thread of the bolt and the pitch of the wall of the washer, the latter being shown as partially seated in the thread. Fig. 8 is a like view showing the wall of the washer fully seated in the thread and the roll of the apex of the thread caused by the difference in pitch of the wall.

1 designates the bolt, having the usual sixty-inch pitch of thread 2, upon which is run a nut 3, locked in adjustment by the washer 4, which is caused to seat into the thread 2 of the bolt by reason of contraction of the wall 5 of the orifice 6 of the washer.

Washer 4 is preferably of disk form, having the central orifice 6 normally of a diameter less than that of the periphery of the thread of the bolt, and is dished to expand the wall of the orifice to a diameter greater than that of the periphery of the bolt, thus allowing of placing the washer upon the top of the nut with the apex of the washer against the same and then forcing the washer to a plane parallel with the face of the nut to contract the wall of the orifice and cause the same to seat in the thread of the bolt when coincident and impinge into the thread when oblique thereto.

The main feature of the invention pertains to the wall of the orifice and aims to a form whereby the weakest portion of the thread shall contact with the most rigid portion of the wall, and thereby slightly distort the thread at the apex and cause the same to curve from the angle of the wall and form an annular locking-ridge, which abuts against the thread of the nut and also prevents the apex 7 of the angle of the wall from first contacting with the base 8 of the thread, a feature of great importance, as it allows free contraction radially without the opposition that would be offered if the thin portion of the wall were opposed by the heaviest portion of the thread. In order to provide the proper angle to the wall of the orifice, the orifice is first trimmed to a plane parallel with the periphery of the thread, as shown in Figs. 3 and 4, by removing the inner V-shaped portion 9 of the wall caused by dishing the washer, thereby transposing the V shape to the apex.

It will be understood that in the form now described the V-shaped apex 10 would enter the thread as the washer is flattened, with the result of presenting the thinnest portion 10 of the washer to the base of the thread and thereby offer resistance to a desirable contraction of the wall of the orifice. In order to avoid this result, the apex 10 is upset, as shown at 11, Fig. 5, thereby presenting an obtuse angle to the parallel walls of the orifice, with the effect of forming an angled wall of sixty-five to seventy degrees inclination when the washer is flattened, which, entering the thread of the bolt, presents the thick part of the inclination to the apices or thin portion of the thread and spreads the same toward and against the nut to form an additional lock to the nut.

Another feature of advantage arising from the difference in inclination of the wall of the washer and thread of the bolt is the fact that the wear upon the wall is at the point of greatest thickness as contradistinguished from a coincident inclination in which the apex of the wall bears initially upon the base of the thread.

In order to insure maximum contraction of the wall of the washer, it is formed with a plurality of recesses 12, radiating from the same.

What I claim is—

A nut-lock washer comprising a conical washer having a central orifice of a diameter to fit the bolt, and seat into the threads when flattened, a portion of the wall of the orifice when the washer is dished being parallel with the length of the bolt, the remaining portion at an angle thereto greater than the angle of the threads of the bolt, whereby, when the washer is flattened, the wall of the washer fits into and spreads the threads toward and against the nut.

In testimony that I claim the foregoing as my own I hereby affix my signature in presence of two witnesses.

ARTHUR L. MILLS.

Witnesses:
WILLIAM WEBSTER,
BERTHA M. SCHWEIZER.